United States Patent
Yamada (10) Patent No.: US 7,542,308 B2
(45) Date of Patent: Jun. 2, 2009

(54) DC-DC CONVERTER

(75) Inventor: Tomoyasu Yamada, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 105 days.

(21) Appl. No.: 11/391,606

(22) Filed: Mar. 27, 2006

(65) Prior Publication Data

US 2006/0221650 A1   Oct. 5, 2006

(30) Foreign Application Priority Data

Mar. 30, 2005   (JP) .............................. 2005-097897

(51) Int. Cl.
*H02M 3/335* (2006.01)
*H02M 5/42* (2006.01)
*H02M 7/537* (2006.01)
*H02M 5/257* (2006.01)
*G05F 5/00* (2006.01)

(52) U.S. Cl. .............. 363/21.01; 363/21.12; 363/21.14; 363/21.15; 363/21.17; 363/21.18; 363/16; 363/20; 363/97; 363/131; 363/163; 363/165; 363/21.13; 323/301; 323/303

(58) Field of Classification Search .................. 363/21, 363/16, 20, 97, 131, 163, 165; 323/301, 323/303

See application file for complete search history.

(56) References Cited

U.S. PATENT DOCUMENTS

| 4,024,437 A | * | 5/1977 | Suzuki | ......................... 361/87 |
| 5,764,495 A | * | 6/1998 | Faulk | ...................... 363/21.13 |
| 2004/0042239 A1 | * | 3/2004 | Kitano | ........................ 363/49 |

* cited by examiner

*Primary Examiner*—Akm E Ullah
*Assistant Examiner*—Jue Zhang
(74) *Attorney, Agent, or Firm*—Bachman & LaPointe, P.C.

(57) ABSTRACT

A DC-DC converter is provided with a control circuit 6 which comprises a drive signal generator 11 for producing on-off signals to a control terminal of a MOS-FET 3 in synchronization with pulse signals $V_{OSC}$ from an oscillator 10; an intermittent controller 12 for producing a control signal $V_{C1}$ to drive signal generator 11 in response to the level of detection signal from an output voltage detector 5 to convert MOS-FET 3 to the intermittent operation during the light load period; and a power control circuit 16 for ceasing power supply $V_{CC}$ to oscillator 10 in response to control signal $V_{C1}$ from intermittent controller 12 to stop production of pulse signal $V_{OSC}$ from oscillator 10 for the cessation term of MOS-FET 3 during the intermittent operation.

4 Claims, 10 Drawing Sheets

DC-DC CONVERTER

TECHNICAL FIELD

This invention relates to a DC-DC converter, in particular, of the type capable of reducing power consumption by stopping oscillation of an oscillator when a switching element is shifted to an intermittent operation during the light load period.

BACKGROUND OF THE INVENTION

A known DC-DC converter comprises a switching element which is turned on and off to intermittently convert DC voltage from a DC power source into an electric power of high frequency, and a transformer for converting the electric power into a stabilized DC power then supplied to an electric load through a rectifying smoother. For example, a prior art DC-DC converter shown in FIG. 1 comprises a primary winding 2a of a transformer 2 and an N-channel MOS-FET 3 as a switching element connected in series to a DC power source 1; secondary and auxiliary windings 2b and 2c of transformer 2 electro-magnetically coupled to primary winding 2a and each other; a main rectifying smoother 14 which has a main rectifying diode 29 and main smoothing capacitor 30 connected to secondary winding 2b; an output voltage detector 5 for detecting DC output voltage $V_{O1}$ from main rectifying smoother 14 to produce a detection signal; a current detector or detecting resistor 28 for detecting winding current $I_D$ through MOS-FET 3 as a detection voltage $V_{R1}$ of the level corresponding to the amount of winding current $I_D$; and a control circuit 6 for producing drive signals $V_G$ to turn MOS-FET 3 on and off in response to detection voltage $V_{R1}$ from current detector 28 and detection signal from output voltage detector 5 through a photo-coupler 34.

Secondary and auxiliary windings 2b and 2c are electro-magnetically coupled to primary winding 2a in the adverse polarity to each other. Output voltage detector 5 picks out output voltage $V_{O1}$ to produce an error voltage between output voltage $V_{O1}$ and a given reference voltage, and the error voltage induces electric current flowing through a light emitting diode 34a to turn it on. By way of example, output voltage detector 5 shown in FIG. 1 comprises a detective series circuit connected between both end terminals of main smoothing capacitor 30, and detective series circuit comprises resistors 33 and 35, an NPN transistor 36 for voltage detection, a Zener diode 37 and light emitting diode 34a of photo-coupler 34 connected in parallel to resistor 33. Also, connected to both terminals of main smoothing capacitor 30 are dividing resistors 38 and 39 whose junction is connected to a base terminal of transistor 36. When DC output voltage $V_{O1}$ between DC output terminals exceeds a voltage set by breakdown voltage of Zener diode 37 and resistors 38 and 39, an electric current flows through light emitting diode 34a, transistor 36 and Zener diode 37 to irradiate light from light emitting diode 34a. Thus, Zener diode 37 and resistors 38 and 39 provide an output reference voltage.

Figure 1:
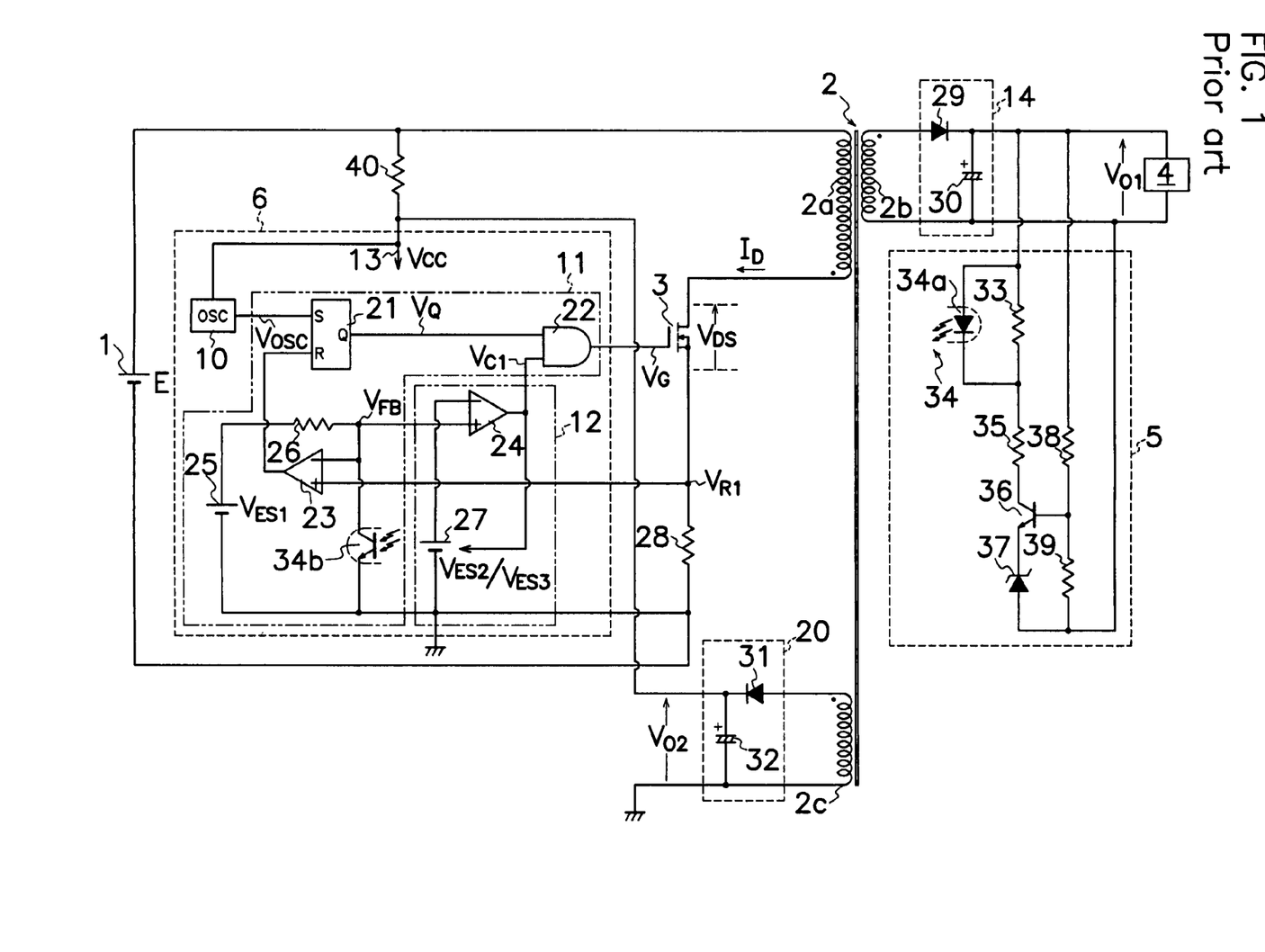
FIG. 1 is an electric circuit diagram showing a prior art DC-DC converter.

In the DC-DC converter shown in FIG. 1, when MOS-FET 3 is turned on and off, secondary winding 2b of transformer 2 produces DC output voltage $V_{O1}$ to an electric load 4 through main rectifying smoother 14, and at the same time, auxiliary winding 2c of transformer 2 generates DC drive voltage $V_{O2}$ which is applied to control circuit 6 through auxiliary rectifying smoother 20. Upon start-up of the converter, an initial current flows from DC power source 1 through a trigger resistor 40 and an auxiliary capacitor 32 to electrically charge auxiliary capacitor 32. When charged voltage in auxiliary capacitor 32 reaches a serviceable level, control circuit 6 starts driving, and once activated, thereafter, it is driven by DC drive voltage $V_{O2}$ generated from auxiliary rectifying smoother 20. Control circuit 6 comprises an oscillator 10 for generating pulse signals $V_{OSC}$ of constant frequency; a drive signal generator 11 for producing on-off signals to a control or gate terminal of MOS-FET 3 synchronously with pulse signals $V_{OSC}$ from oscillator 10; and an intermittent controller 12 for producing control signals $V_{C1}$ to drive signal generator 11 in response to the level of detection signal from output voltage detector 5 to switch MOS-FET 3 to the intermittent operation during the light load period.

Drive signal generator 11 comprises an AND gate 22 as a gate circuit for producing drive signals $V_G$ to gate terminal of MOS-FET 3; an RS flip flop (RSF/F) 21 set when pulse signal $V_{OSC}$ from oscillator 10 is supplied to a set terminal S of RSF/F 21 to forward an output signal $V_Q$ from the output terminal Q to an input terminal of AND gate 22; a normal power supply 25 for producing a basic reference voltage $V_{ES1}$; and a first comparator 23 as a first comparing circuit for comparing detection voltage $V_{R1}$ from current detecting resistor 28 at the non-inverted input terminal+with comparative voltage $V_{FB}$ appearing at the inverted input terminal−and on a junction between a relative resistor 26 and phototransistor 34b of photo-coupler 34. First comparator 23 produces a reset signal to a reset terminal R of RSF/F 21 which is then reset.

Intermittent controller 12 comprises a power supply 27 for producing a reference voltage $V_{ES2}/V_{ES3}$, and a second comparator 24 as a second comparing circuit for comparing comparative voltage $V_{FB}$ at the non-inverted input terminal+with reference voltage $V_{ES2}/V_{ES3}$ from second power supply 27 at the inverted input terminal−. In this case, comparative voltage $V_{FB}$ becomes lower with the increase in DC output voltage $V_{O1}$, and current detecting resistor 28 picks up detection voltage $V_{R1}$ of the level corresponding to the amount $I_D$ of winding current flowing through MOS-FET 3. When comparative voltage $V_{FB}$ is lower than detection voltage $V_{R1}$, first comparator 23 produces the control signal to stop drive signal $V_G$ from AND gate 22 and determine the on period of MOS-FET 3. When comparative voltage $V_{FB}$ is lower than reference voltage $V_{ES2}/V_{ES3}$, second comparator 24 produces control signal $V_{C1}$ to AND gate 22 to make AND gate 22 inhibit to produce drive signal $V_G$ to thereby provide an off or inoperative period for temporarily stopping switching operation of MOS-FET 3 so that MOS-FET 3 is shifted from the ordinary operation to the intermittent operation.

Figure 2:
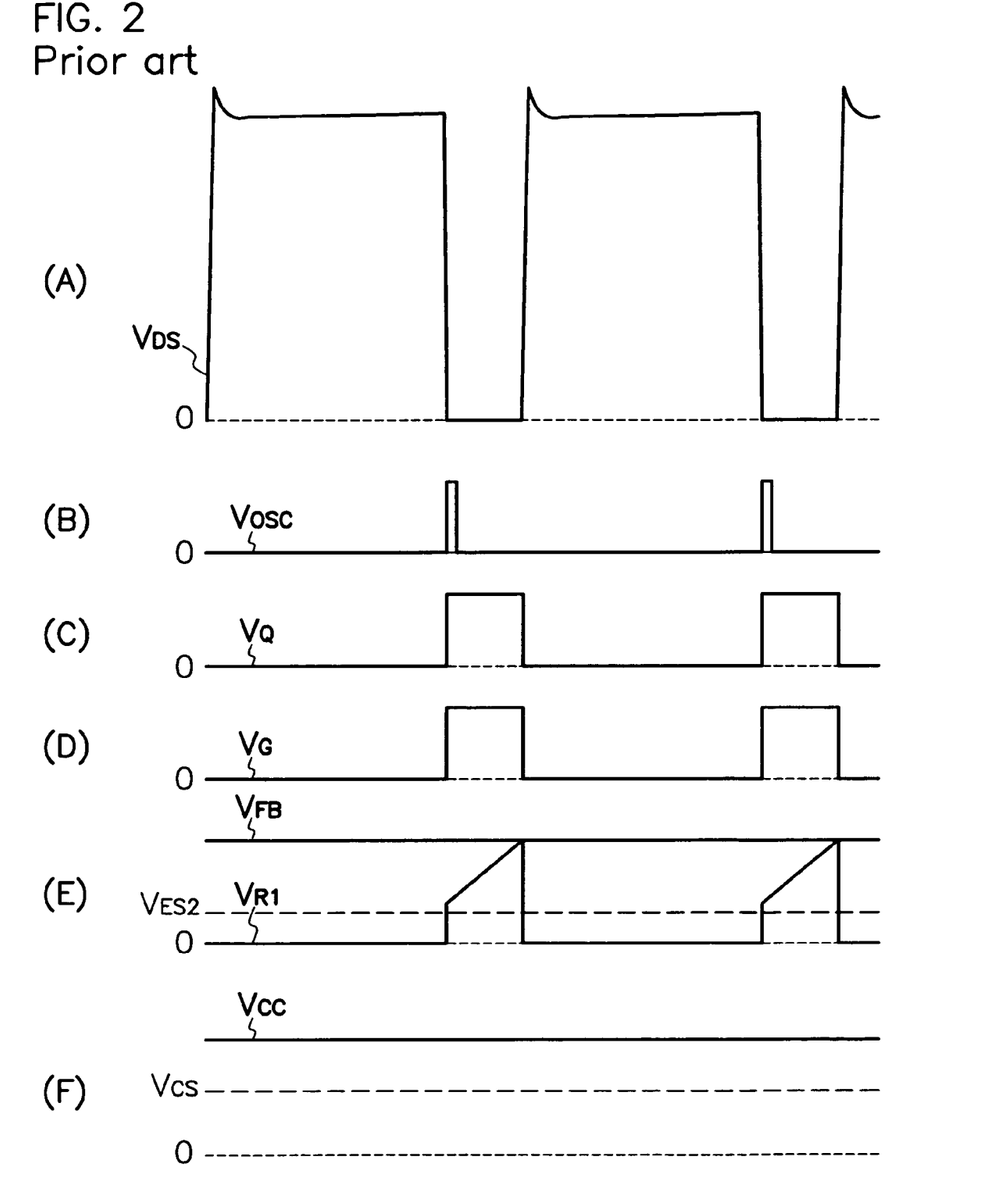
FIG. 2 is a time chart of voltage waveforms at selected locations in FIG. 1 during the non-light load period of the converter.
Figure 3:
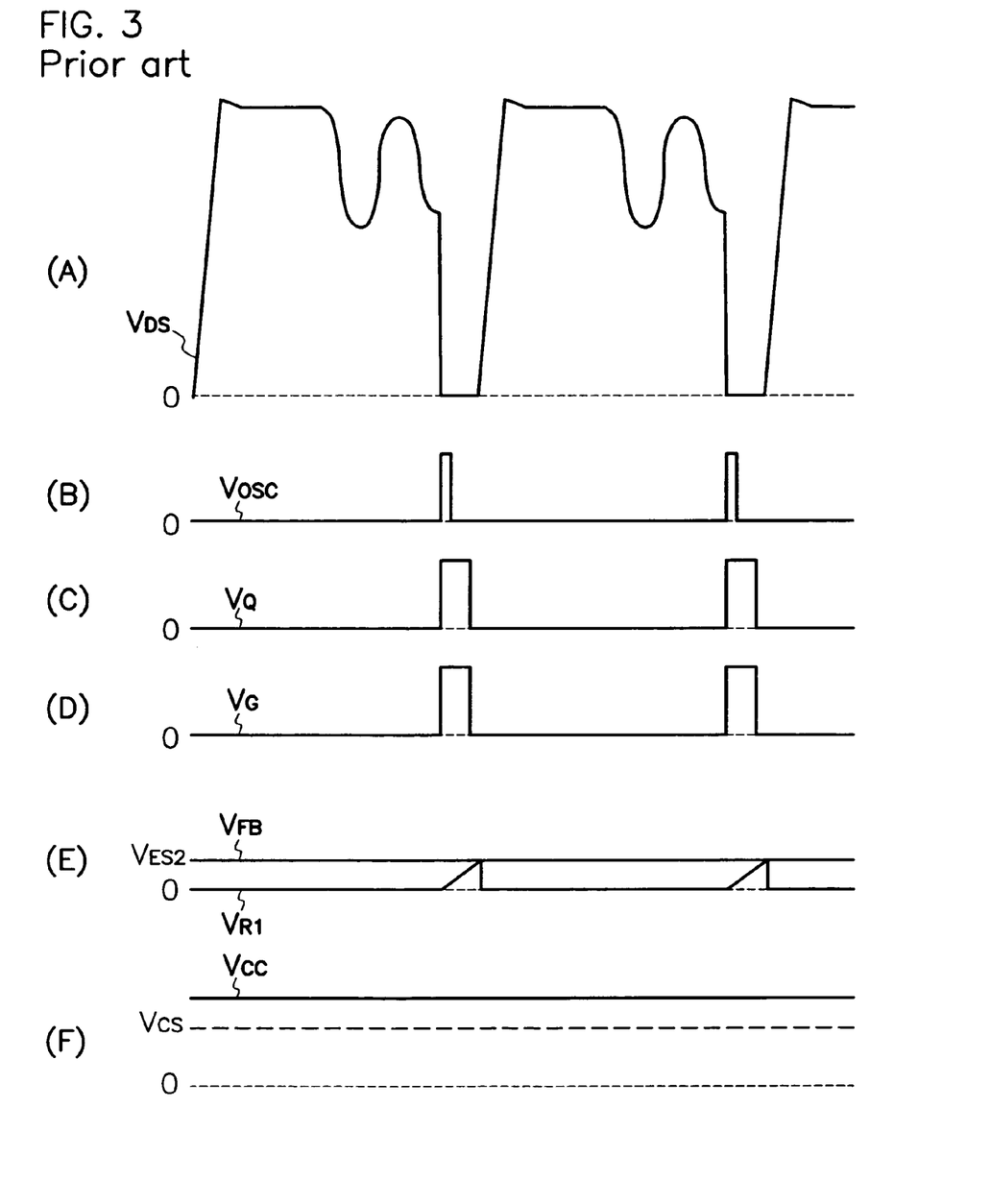
FIG. 3 is a time chart of voltage waveforms at selected locations in FIG. 1 immediately before a MOS-FET comes to the intermittent operation during the light load period.
Figure 4:
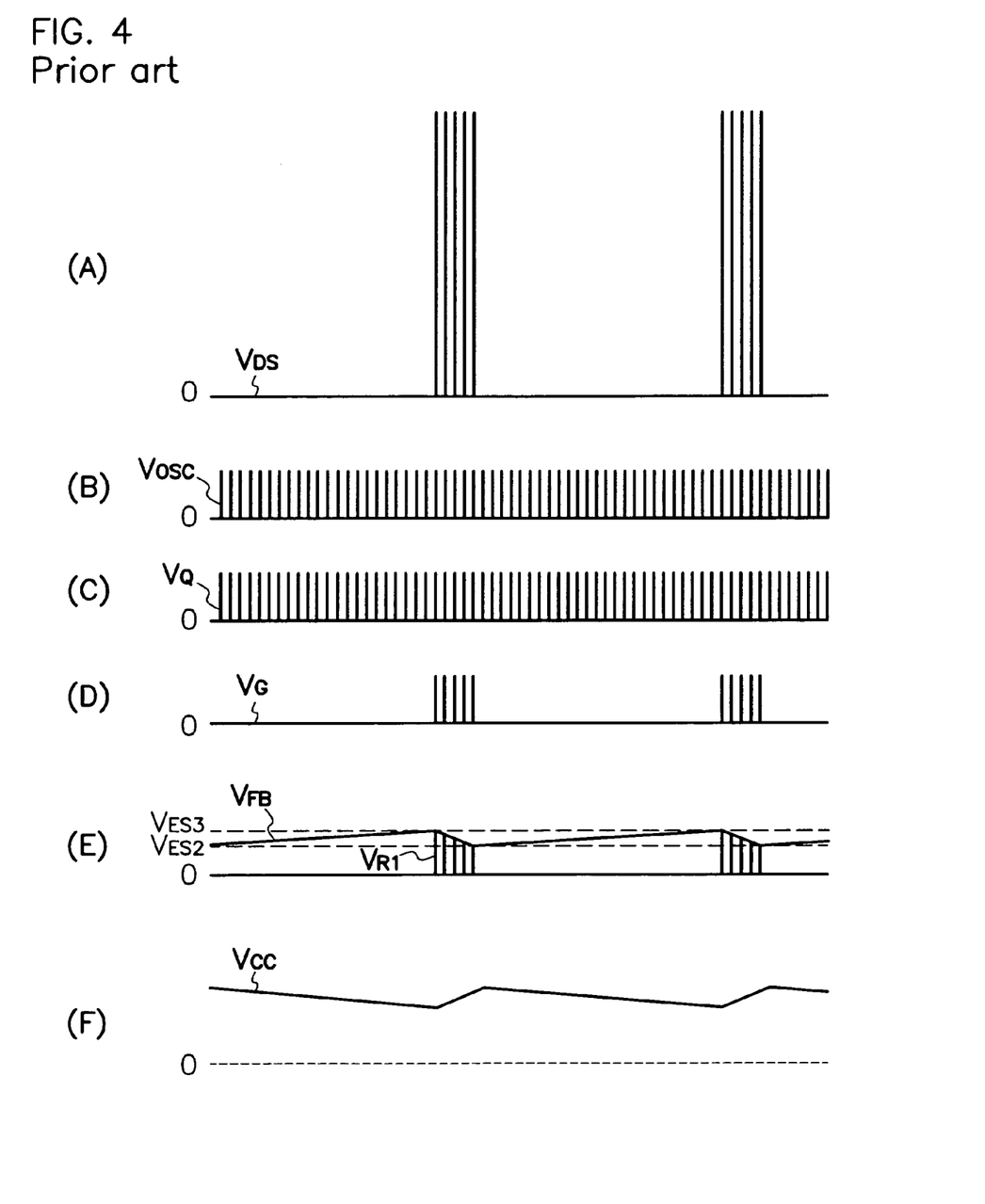
FIG. 4 is a time chart of voltage waveforms at selected locations in FIG. 1 while MOS-FET is in the intermittent operation during the light load period.

FIGS. 2, 3 and 4 indicate voltage waveforms at selected locations of DC-DC converter in FIG. 1 wherein (A), (B), (C), (D), (E) and (F) respectively denote a voltage $V_{DS}$ between drain and source terminals of MOS-FET 3, voltage $V_{OSC}$ of pulse signal of constant frequency developed from oscillator 10, output voltage $V_Q$ at output terminal Q of RSF/F 21, voltage $V_G$ of drive signal output from AND gate 22, comparative voltage $V_{FB}$ and detection voltage $V_{R1}$ from current detecting resistor 28, and voltage $V_{CC}$ of drive power supplied to control circuit 6. Also, FIGS. 2, 3 and 4 represent the waveforms respectively of during the non-light load period, of immediately before MOS-FET 3 comes to the intermittent operation, and of under the intermittent operation of MOS-FET 3 during the light load period. In the waveform (E), dotted lines indicate levels of reference voltages $V_{ES2}$ and $V_{ES3}$.

In operation of DC-DC converter shown in FIG. 1, a switch not shown is turned on to supply electric power to the converter, thereby DC voltage E of DC power source 1 generates an initial current through trigger resistor 40 to auxiliary smoothing capacitor 32 of auxiliary rectifying smoother 20 to electrically charge auxiliary smoothing capacitor 32. When charged voltage $VO_{O2}$ in auxiliary smoothing capacitor 32 reaches a serviceable level of control circuit 6, drive voltage $V_{CC}$ is applied to oscillator 10, drive signal generator 11 and intermittent controller 12 to cause control circuit 6 to start driving. Accordingly, oscillator 10 produces an output signal or pulse signal $V_{OSC}$ of high voltage level and constant frequency to set input terminal of RSF/F 21 to set RSF/F 21 which therefore produces the output of high voltage level at output terminal Q to AND gate 22. At the moment, as detection voltage $V_{R1}$ on current detecting resistor 28 is lower than comparative voltage $V_{FB}$, first comparator 23 produces the output of low voltage level to reset terminal R of RSF/F 21 not to reset RSF/F 21. On the other hand, as comparative voltage $V_{FB}$ is higher than reference voltage $V_{ES2}/V_{ES3}$, second comparator 24 produces output $V_{C1}$ of high voltage level to AND gate 22 which then forwards drive signal $V_G$ of high voltage level to gate terminal of MOS-FET 3 to turn it on.

When MOS-FET 3 is turned on, winding current $I_D$ flows from DC power source 1 through primary winding 2a of transformer 2, MOS-FET 3 and current detecting resistor 28 which constitute a primary closed circuit to accumulate electromagnetic energy in transformer 2, and current detecting resistor 28 converts winding current $I_D$ into detection voltage $V_{R1}$ of the level corresponding to the amount of winding current $I_D$. As shown in FIG. 2(E), when detection voltage $V_{R1}$ reaches the level of comparative voltage $V_{FB}$, first comparator 23 produces the output of high voltage level to reset terminal of RSF/F 21 which therefore is reset. As a result, RSF/F 21 produces the output of low voltage level at the output terminal Q to change drive signal $V_G$ to low voltage level to turn MOS-FET 3 off. After the turning-off of MOS-FET 3, electric current flows from secondary winding 2b of transformer 2 through main rectifying diode 29 and main smoothing capacitor 30 of main rectifying smoother 14 to supply DC output current to load 4 under DC output voltage $V_{O1}$, releasing electromagnetic energy from transformer 2. Simultaneously, drive current flows from auxiliary winding 2c of transformer 2 through auxiliary rectifying diode 31 and auxiliary smoothing capacitor 32 of auxiliary rectifying smoother 20 to control circuit 11 under DC drive voltage $V_{O2}$, also discharging electromagnetic energy from transformer 2. Output voltage detector 5 compares DC output voltage $V_{O1}$ with output reference voltage set by Zener diode 37 and resistors 38 and 39 to produce an error or differential signal between DC output voltage $V_{O1}$ and output reference voltage so that differential signal causes electric current to flow through light emitting diode 34a of photo-coupler 34. Light output from light emitting diode 34a is received in primary side by photo-transistor 34b which allows electric current of the amount corresponding to the level of DC output voltage $V_{O1}$ to pass through photo-transistor 34b and thereby induce comparative voltage $V_{FB}$ at a junction of relative resistor 26 and photo-transistor 34b.

Under the non-light condition including the heavy and ordinary conditions of load, DC output voltage $V_{O1}$ becomes lower and less amount of electric current flows through photo-transistor 34b to cause the level of comparative voltage $V_{FB}$ to rise. Accordingly, first comparator 23 does not provide the output of high voltage level to reset terminal R of RSF/F 21 to reset RSF/F 21 until detection voltage $V_{R1}$ reaches the level of comparative voltage $V_{FB}$. However, when winding current $I_D$ increases so that detection voltage $V_{R1}$ becomes higher than comparative voltage $V_{FB}$, first comparator 23 produces the output of high voltage level to reset terminal R of RSF/F 21 which therefore is reset. When load 4 is in the light condition, DC output voltage $V_{O1}$ rises to increase electric current flowing through photo-transistor 34b and lower the level of comparative voltage $V_{FB}$. Accordingly, at an early stage after MOS-FET 3 is turned on, detection voltage $V_{R1}$ becomes higher than comparative voltage $V_{FB}$ so that first comparator 23 produces the output of high voltage level to reset terminal of RSF/F 21 which therefore is reset. Reset RSF/F 21 produces at the output terminal Q signal $V_Q$ of low voltage level to switch drive signal $V_G$ from AND gate 22 to low voltage level and thereby control or reduce time-width or span of drive signal $V_G$ to gate terminal of MOS-FET 3. In this way, the on-period of MOS-FET 3 to reduce winding current $I_D$ through primary closed circuit of transformer 2 to control and stabilize DC output voltage $V_{O1}$ to load 4 to a substantially constant level.

When load 4 becomes still lighter to a ultra-light condition including an unloading, DC output voltage $V_{O1}$ rises and adversely comparative voltage $V_{FB}$ drops below reference voltage $V_{ES2}$. At this time, second comparator 24 produces control signal $V_{C1}$ of low voltage level to prevent AND gate 22 from generating drive signal $V_G$. At the same time, control signal $V_{C1}$ of low voltage level shifts reference voltage from first $V_{ES2}$ to second $V_{ES3}$ higher than $V_{ES2}$. As MOS-FET 3 has already stopped the on-off operation, the output voltage $V_{O1}$ gradually decreases, and as a result, comparative voltage $V_{FB}$ gradually increases. When comparative voltage $V_{FB}$ soon exceeds second reference voltage $V_{ES3}$, second comparator 24 produces control signal $V_{C1}$ of high voltage level so that AND gate 22 issues drive signal $V_G$ to gate terminal of MOS-FET 3. Concurrently, control signal $V_{C1}$ of high voltage level shifts reference voltage from $V_{ES3}$ to $V_{ES2}$ lower than $V_{ES3}$ to make MOS-FET 3 resume the switching operation to raise DC output voltage $V_{O1}$. As above-mentioned, intermittent controller 12 can switch MOS-FET 3 to the intermittent operation which provides an abeyance period for ceasing switching operation of MOS-FET 3 during the light load period including unloading as shown in FIG. 4.

Figure 5:
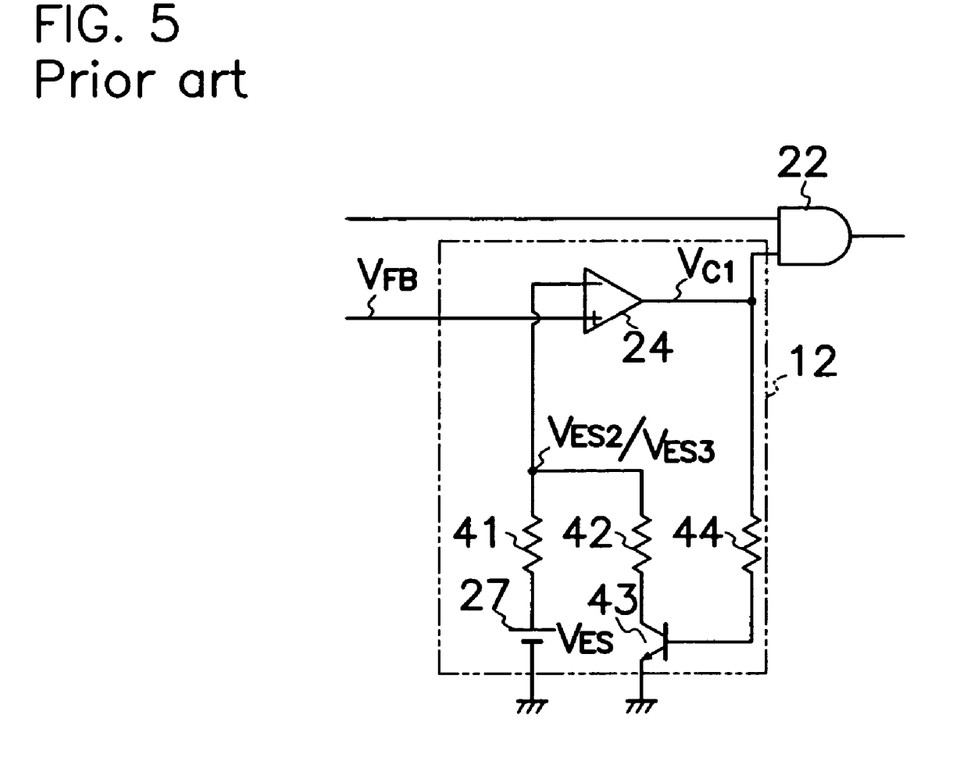
FIG. 5 is an electric circuit diagram showing another embodiment of the intermittent control circuit.

For example, as shown in FIG. 5, intermittent controller 12 comprises a first series circuit of a resistor 41 and a normal power supply 27 connected between inverted input terminal of second comparator 24 and ground, and a second series circuit of a resistor 42 and an intermittent NPN transistor 43 connected in parallel to first series circuit. A base terminal of intermittent NPN transistor 43 is connected to output terminal of second comparator 24 through a resistor 44. When load 4 moves from the non-light condition to the light condition, intermittent transistor 43 is in the on or conductive condition because base terminal of intermittent transistor 43 receives control signal $V_{C1}$ of high voltage level from second comparator 24, and therefore, inverted input terminal–of second comparator 24 receives first reference voltage $V_{ES2}$ split by dividing resistors 41 and 42 from reference voltage $V_{ES}$. Second comparator 24 compares comparative voltage $V_{FB}$ with first split reference voltage $V_{ES2}$ to produce control signal $V_{C1}$ of low voltage level to AND gate 22 to shift MOS-FET 3 to the intermittent operation because comparative voltage $V_{FB}$ is lower than first split reference voltage $V_{ES2}$.

When MOS-FET 3 is shifted to the intermittent operation, output voltage $V_{O1}$ immediately drops so that output voltage detector 5 detects detection signal of lowered level to raise comparative voltage $V_{FB}$. Accordingly, again second comparator 24 produces control signal $V_{C1}$ of high voltage level to turn MOS-FET 3 on, and no further intermittent operation is maintained. However, intermittent controller 12 shown in FIG. 5 changes reference voltage from first low $V_{ES2}$ to second high $V_{ES3}$ when second comparator 24 produces control signal $V_{C1}$ of low voltage level to turn intermittent transistor 43 off so that inverted input terminal—of second comparator 24 receives second high $V_{ES3}$ to thereby maintain comparative voltage $V_{FB}$ lower than high $V_{ES3}$. Consequently, second comparator 24 continues to produce control signal $V_{C1}$ of low voltage level to AND gate 22 to retain MOS-FET 3 in the intermittent operation. Specifically, while comparative voltage $V_{FB}$ rises immediately after MOS-FET 3 is shifted to the intermittent operation, second comparator 24 switches reference voltage from first low $V_{ES2}$ to second high $V_{ES3}$ during the light load period to extend the term of rising comparative voltage $V_{FB}$ lower than high $V_{ES3}$. In this way, second comparator 24 has the hysteretic characteristics by two different values $V_{ES2}$ and $V_{ES3}$ for reference voltage to extend the abeyance period of the intermittent operation, thereby resulting in reduction in switching loss of MOS-FET 3 during the light load period.

DC-DC converter shown in FIG. 1, however, has a drawback of low efficiency in power conversion during the light load period because oscillator 10 continues to produce pulse signals $V_{OSC}$ during the intermittent operation of MOS-FET 3 as undesirably the converter represents power consumption of very unchanged level between the light and non-light load periods. In other words, during the intermittent operation of MOS-FET 3, oscillator 10 spends major amount of electric power supplied to control circuit 6, but, other circuits in control circuit 6 than oscillator 10 are kept in a pause for using almost no power. Japanese Patent Disclosure No. 4-42771 discloses a high efficiency DC-DC converter for ceasing power supply to a control circuit in response to output from an output voltage detector during the light load period to convert a switching element to the intermittent operation by control circuit. In this converter, cease of power supply to control circuit can reduce power consumption by oscillator in control circuit.

However, the DC-DC converter shown in the foregoing reference interrupts whole drive power to control circuit, and therefore, suspends power supply to power supplies for producing reference voltages, comparators, amplifiers or the like other than oscillator each time switching element comes to the intermittent operation. Also, as it takes a necessary time until reference voltages inside of control circuit reach a steady level from no-power supplied condition, similarly to upon power-on, large output ripples may appear in DC output due to the delayed response when switching element is converted from the intermittent operation to the ordinary operation so that output ripples may disadvantageously cause malfunction in devices connected to the switching power source. To suppress output ripples, rectifying smoother needs a capacitor of large capacitance, or electric current to load has to be reduced to a small amount, however, these measures may unfavorably increase costs in manufacture due to employment of large capacitance capacitor, expanded size of the converter and shortage of supplied power by reduction in electric current to load.

Accordingly, an object of the present invention is to provide a DC-DC converter capable of reducing power consumption in an oscillator by effectively ceasing oscillation of the oscillator when a switching element is converted to an intermittent operation during the light load period.

SUMMARY OF THE INVENTION

The DC-DC converter according to the present invention comprises a primary winding (2a) of a transformer (2) and at least one switching element (3) connected in series to a DC power source (1); a secondary winding (2b) of the transformer (2); a rectifying smoother (14) connected to the primary or secondary winding (2a or 2b) of the transformer (2) for supplying DC power to an electric load (4); an output voltage detector (5) for sensing an output voltage ($V_{O1}$) to the load (4) to produce a detection signal; and a control circuit (6) for receiving the detection signal from the output voltage detector (5) to produce on-off signals to a control terminal of the switching element (3). The control circuit (6) comprises an oscillator (10) for generating pulse signals ($V_{OSC}$) of a given frequency; a drive signal generator (11) for producing on-off signals to the control terminal of the switching element (3) in synchronization with pulse signals ($V_{OSC}$) from the oscillator (10); an intermittent controller (12) for producing a control signal ($V_{C1}$) to the drive signal generator (11) in response to the level of detection signal from the output voltage detector (5) to convert the switching element (3) to the intermittent operation during the light load period; and a power control circuit (16) for ceasing power supply ($V_{CC}$) to the oscillator (10) in response to the control signal ($V_{C1}$) from the intermittent controller (12) to stop production of pulse signal ($V_{OSC}$) from the oscillator (10) for the cessation or suspension term of the switching element (3) during the intermittent operation. Accordingly, the power control circuit (16) converts the switching element (3) to the intermittent operation of the term for ceasing the switching operation during the light load period to reduce switching loss and improve switching efficiency. Also, the power control circuit (16) inhibits production of pulse signal ($V_{OSC}$) from the oscillator (10) during the output cessation period by the intermittent operation to decrease power consumption of the oscillator (10). Moreover, as the power control circuit (16) inhibits power supply ($V_{CC}$) to the only highly power-consumptive oscillator (10), other circuits than the oscillator (10) in the control circuit (6) display quick response because drive power ($V_{CC}$) is supplied to these circuits when the switching element (3) is converted from the intermittent operation to the ordinary operation. Also, quick response of the circuits can produce DC output without large output ripple which may occur due to the delayed response of a switching element in a prior art technique for inhibiting power supply to a whole control circuit.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of the DC-DC converter according to the present invention will be described hereinafter in connection with FIGS. 6 to 11 of the drawings. Same reference symbols as those shown in FIGS. 1 and 5 are applied to similar portions in FIGS. 6 to 11, omitting explanation therefor.

Figure 6:
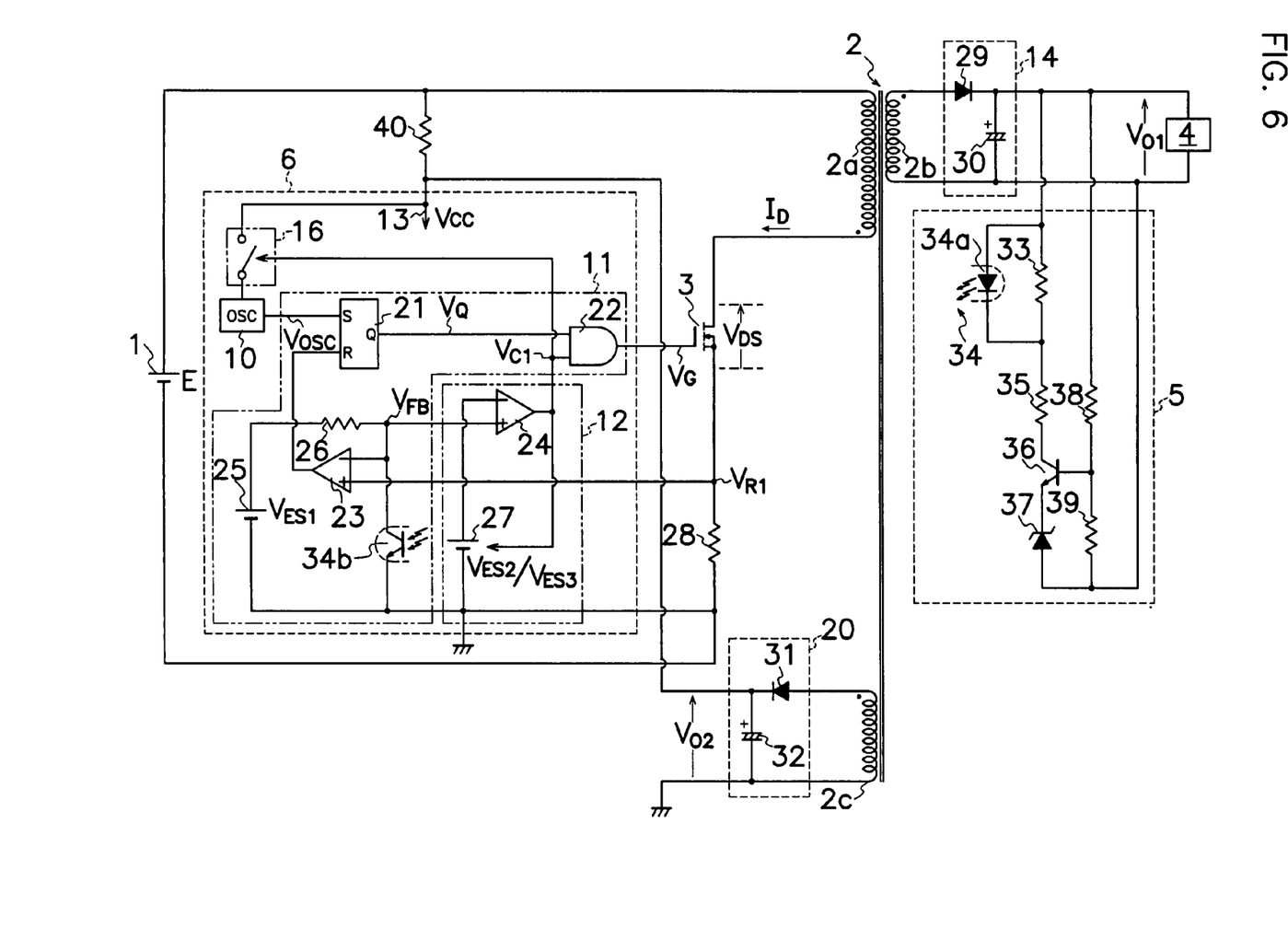
FIG. 6 is an electric circuit diagram showing an embodiment of the DC-DC converter according to the present invention.

The DC-DC converter according to the embodiment shown in FIG. 6 has a structural difference from that shown in FIG. 1 in that the former converter comprises a power control circuit 16 for ceasing power supply $V_{CC}$ to oscillator 10 in response to control signal $V_{C1}$ from intermittent controller 12. In detail, power control circuit 16 stops supply of drive power $V_{CC}$ to oscillator 10 upon receiving control signal $V_{C1}$ of low voltage level transmitted from second comparator 24 of intermittent controller 12 to AND gate 22 of drive signal generator 11. Other compositions are similar to those in prior art DC-DC converter shown in FIG. 1.

Figure 7:
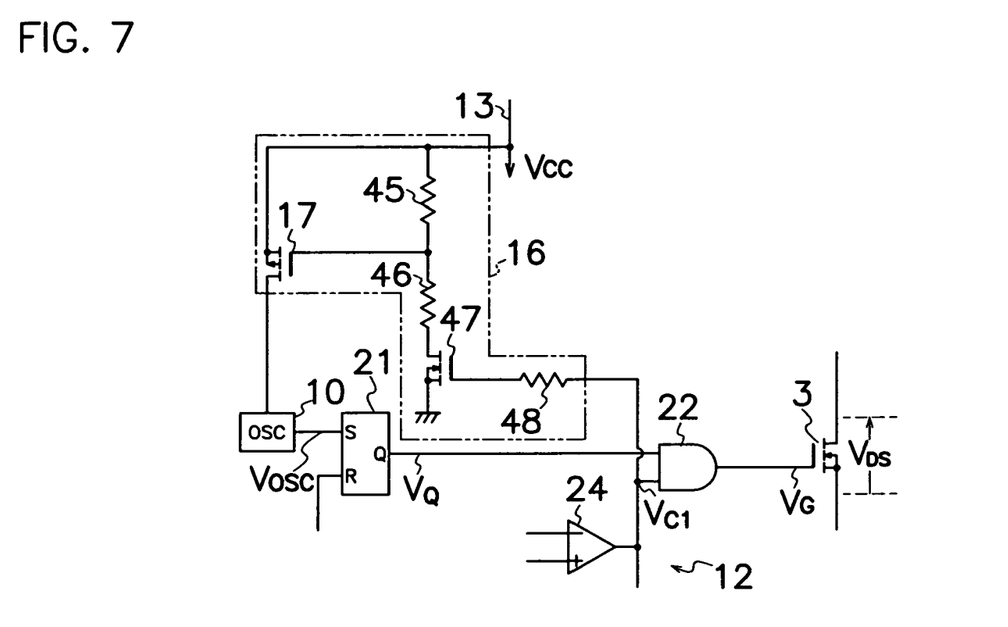
FIG. 7 is an electric circuit diagram showing a first embodiment of a power control circuit shown in FIG. 6.

FIG. 7 shows a first embodiment of power control circuit 16 which comprises a P-channel MOS-FET 17 as a switch element connected between a drive power source 13 and oscillator 10 to receive drive power $V_{CC}$ from drive power source 13. MOS-FET 17 is turned off when second comparator 24 of intermittent controller 12 produces the output of low voltage level $V_{C1}$ to AND gate 22 of signal output circuit 11. Power control circuit 16 comprises a series circuit of resistors 45 and 46 and N-channel MOS-FET 47 connected in series between a junction of drive power source 13 and P-channel MOS-FET 17 and ground; a gate terminal of P-channel MOS-FET 17 is connected to a junction of resistors 45 and 46; and a gate terminal of N-channel MOS-FET 47 is connected to output terminal of second comparator 24 through a resistor 48.

Figure 8:
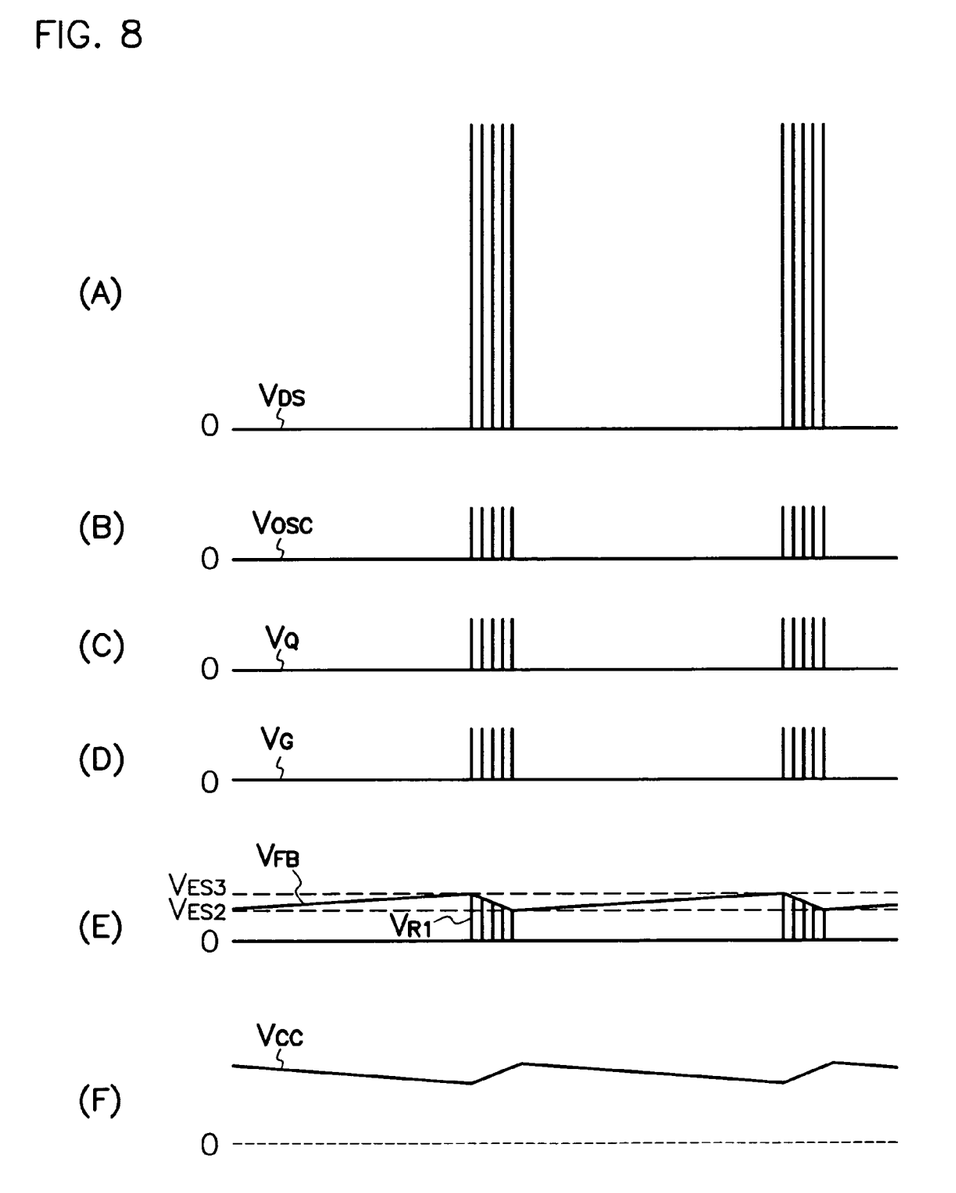
FIG. 8 is a time chart of voltage waveforms at selected locations in FIG. 6.

FIG. 8 shows voltage waveforms in selected location of the circuit when MOS-FET 3 is converted to the intermittent operation during the light load period. When second comparator 24 produces control signal $V_{C1}$ of high voltage level to AND gate 22 to turn MOS-FET 3 on, the control signal $V_{C1}$ is also applied to gate terminal of N-channel MOS-FET 47 which then is turned on to apply to gate terminal of P-channel MOS-FET 17 from drive power source 13 a lower voltage than a threshold level divided by resistors 45 and 46. Under the condition, P-channel MOS-FET 17 is turned on to supply drive power $V_{CC}$ from drive power source 13 to oscillator 10. To the contrary, when second comparator 24 produces control signal of low voltage level to AND gate 22 to turn MOS-FET 3 off, the control signal $V_{C1}$ is also applied to gate terminal of N-channel MOS-FET 47 which then is turned off to apply to gate terminal of P-channel MOS-FET 17 from drive power source 13 a higher voltage than threshold level divided by resistors 45 and 46. For that reason, P-channel MOS-FET 17 is turned off to stop and inhibit supply of drive power $V_{CC}$ from drive power source 13 to oscillator 10. FIGS. 8(B) and 8(F) apparently demonstrate the function that oscillator 10 ceases output of pulse signals $V_{OSC}$ synchronously with the off-operation of MOS-FET 3 when MOS-FET 3 is turned off to stop the switching operation, decreasing drive power $V_{CC}$ to control circuit 6.

Figure 9:
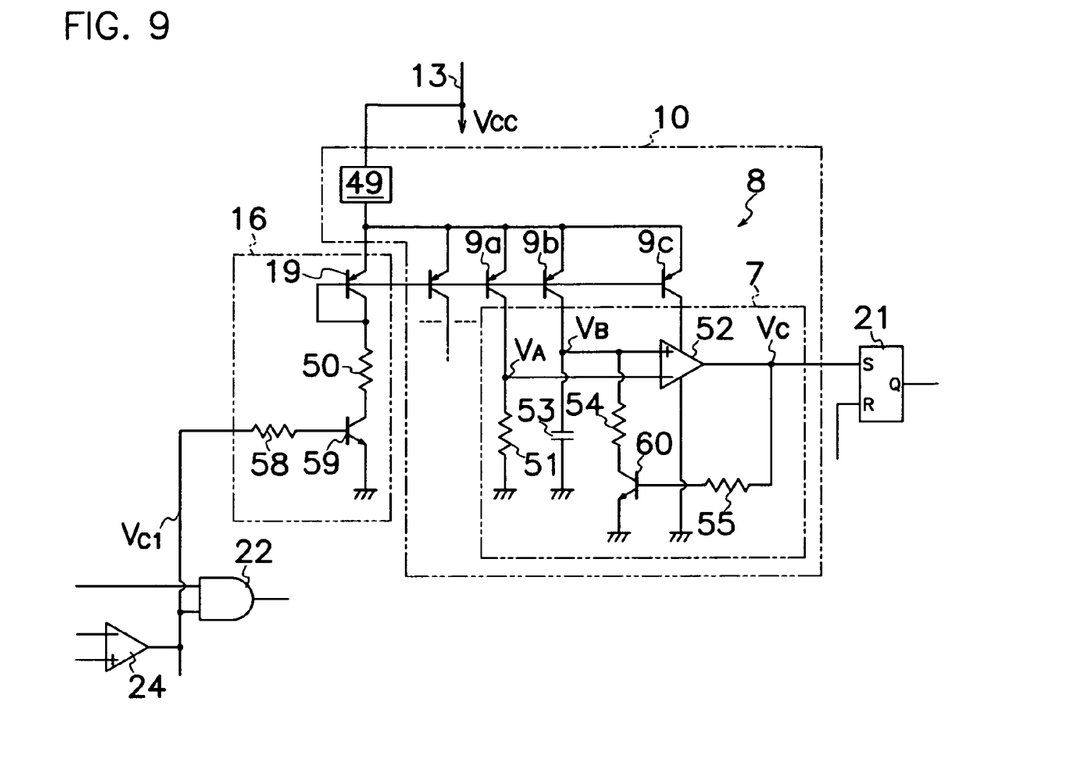
FIG. 9 is an electric circuit diagram showing a second embodiment of a power control circuit shown in FIG. 6.

FIG. 9 illustrates a second embodiment of power control circuit 16, but otherwise, oscillator 10 comprises a signal generator 7 for producing pulse signals $V_{OSC}$, and a power supplying circuit 8 for feeding drive power $V_{CC}$ to signal generator 7 of oscillator 10. Power supplying circuit 8 comprises a feed PNP transistors 9a to 9c as switches connected between drive power source 13 and signal generator 7 to receive drive power $V_{CC}$ from drive power source 13. Power control circuit 16 turns feed PNP transistors 9a to 9c off when second comparator 24 produces control signal $V_{C1}$ of low voltage level to AND gate 22 of signal output circuit 11. Drive power $V_{CC}$ is modulated to a constant voltage through a voltage regulator 49 on which drive power $V_{CC}$ is applied, and supplied to oscillator 10. Power control circuit 16 comprises a series circuit of a first control PNP transistor 19, a resistor 50 and a second control NPN transistor 59 connected between voltage regulator 49 and ground, and a base terminal of second control NPN transistor 59 is connected to output terminal of second comparator 24 through a resistor 58. Power supplying circuit 8 illustrated in FIG. 9 comprises a plurality of feed PNP transistors 9a to 9c for forming a current mirror circuit together with control PNP transistor 19 of power control circuit 16 to supply electric current from voltage regulator 49 through feed PNP transistors 9a to 9c to signal generator 7.

Signal generator 7 comprises a resistor 51 for detecting electric current from a first feed PNP transistor 9a as a voltage $V_A$ of the level corresponding to the amount of electric current through resistor 51; a capacitor 53 electrically charged with electric current through second feed PNP transistor 9b; a regulatory comparator 52 for comparing sensed voltage $V_A$ from resistor 51 to the non-inverted input terminal with voltage $V_B$ on capacitor 53 connected to second feed PNP transistor 9b and the inverted input terminal; and a series circuit of a resistor 54 and regulatory NPN transistor 60 connected between a junction of feed PNP transistor 9b and capacitor 53 and ground. A base terminal of regulatory NPN transistor 60 is connected to output terminal of regulatory comparator 52 through a resistor 55, an emitter terminal of transistor 60 is connected to ground, and a collector terminal of transistor 60 is connected to junction of feed PNP transistor 9b and capacitor 53 and non-inverted input terminal of regulatory comparator 52 through resistor 54. A collector terminal of third feed PNP transistor 9c is connected to a positive power source terminal of regulatory comparator 52 whose negative power source terminal is connected to ground.

Figure 10:
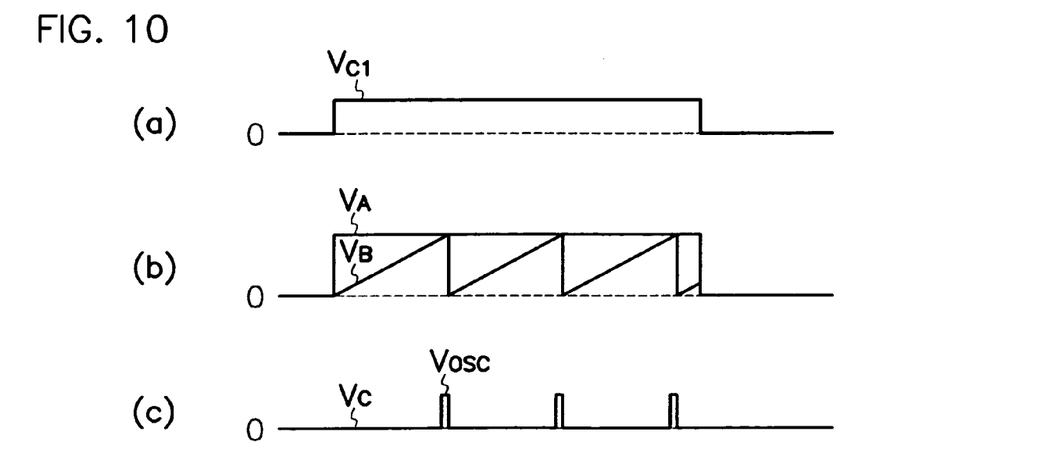
FIG. 10 is a time chart of voltage waveforms at selected locations in FIG. 9.

FIG. 10 shows a time chart of voltage waveforms at selected locations in oscillator 10 shown in FIG. 9 wherein FIGS. 10(a), 10(b) and 10(c) represent respectively control signal $V_{C1}$ given from second comparator 24 to power control circuit 16; sensed voltage $V_A$ detected by resistor 51 and fluctuant voltage $V_B$ in capacitor 53; and output voltage $V_C$ forwarded from regulatory comparator 52 to RSF/F 21. When second comparator 24 produces control signal $V_{C1}$ of high voltage level to AND gate 22 to turn AND gate 22 on, the control signal $V_{C1}$ is also applied to base terminal of second control NPN transistor 59 which is simultaneously turned on to switch control PNP transistor 19 on because base terminal of control PNP transistor 19 receives lower voltage than threshold level of PNP transistor 19 due to the conductive or on state of second control NPN transistor 59. Accordingly, electric current flows from voltage regulator 49 through control PNP transistor 19, resistor 50 and second control NPN transistor 59, and concurrently, branched constant electric currents of substantially same level flow from voltage regulator 49 through a plurality of feed PNP transistors 9a to 9c of current mirror circuit to cause a constant voltage $V_A$ to appear on resistor 51 and linearly increasing voltage $V_B$ to appear on capacitor 53 charged with constant current as shown in FIG. 10(b). When charged voltage $V_B$ exceeds constant voltage $V_A$, regulatory comparator 52 produces output signal $V_C$ of high voltage level to RSF/F 21 and to regulatory NPN transistor 60 which is therefore turned on to discharge capacitor 53. Thus, charged voltage $V_B$ drops below constant voltage $V_A$ so that regulatory comparator 52 produces output signal $V_C$ of low voltage level to provide a pulse signal $V_{OSC}$ to set terminal S of RSF/F 21.

When second comparator 24 produces control signal $V_{C1}$ of low voltage level to AND gate 22 to turn MOS-FET 3 off, the control signal $V_{C1}$ is also applied to base terminal of second control NPN transistor 59 to switch second control NPN transistor 59 off. Accordingly, control PNP transistor 19 and feed PNP transistors 9a to 9c of current mirror circuit are simultaneously turned off to shut off electric current from voltage regulator 49 to signal generator 7 in order to cease supply of drive power $V_{CC}$ from drive power source 13 to voltage regulator 49 of oscillator 10 and restrain oscillator 10 from consuming drive power $V_{CC}$.

As mentioned in connection with the foregoing first and second embodiments, power control circuit 16 can stop supply of drive power $V_{CC}$ to oscillator 10 for the off period of MOS-FET 3 during the intermittent operation in response to voltage level of control signal $V_{C1}$ from intermittent controller 12 to inhibit generation of pulse signal $V_{OSC}$ from oscillator 10. This ensures that intermittent controller 12 can convert MOS-FET 3 to the intermittent operation during the light load period to reduce switching loss for improvement in switching efficiency, and at the same time, power control circuit 16 can cease generation of pulse signal $V_{OSC}$ from oscillator 10 during the output cessation period by the intermittent operation to reduce power consumption by oscillator 10. Also, as power control circuit 16 halts supply of drive power $V_{CC}$ only to highly power-consumptive oscillator 10, other circuits than oscillator 10 in control circuit 6 display quick response because drive power $V_{CC}$ is supplied to these circuits when MOS-FET 3 is converted from the intermittent operation to the ordinary operation, preventing large output ripple which may occur in DC output due to the delayed response of MOS-FET in a prior art technique for inhibiting power supply to a whole control circuit.

Accordingly, the converter according to the present invention ensures reduction in power consumption by an oscillator during the light load period and improvement in power conversion efficiency with inhibition of output ripple. The present invention is suitably applicable to DC-DC converters which have an oscillator in a control circuit for turning a switching element on and off.

Figure 11:
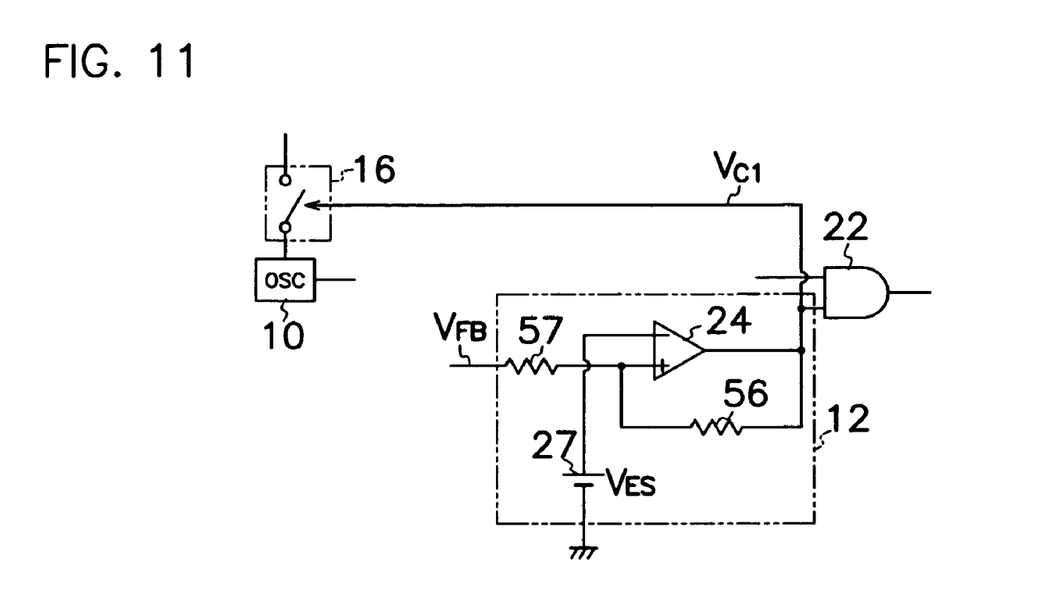
FIG. 11 is an electric circuit diagram showing a first embodiment of an intermittent control circuit.

Embodiments according to the present invention may be modified in further various ways without limitation to the foregoing embodiments. By way of example, intermittent controller 12 shown in FIG. 5 may be designed with a hysteretic comparator as shown in FIG. 1. As illustrated, second comparator 24 of intermittent controller 12 comprises a normal power supply 27 connected between inverted input terminal-of second comparator 24 and ground for generating a reference voltage $V_{ES}$, and a feedback resistor 56 connected between output terminal and non-inverted input terminal+of second comparator 24 for positive feedback of the output. When MOS-FET 3 is converted to the intermittent operation, non-inverted input terminal+of second comparator 24 is kept in the current voltage level in accordance with the hysteretic characteristics of second comparator 24 to extend the term of increasing comparative voltage $V_{FB}$ lower than reference voltage $V_{ES}$ although output voltage $V_{O1}$ immediately drops and comparative voltage $V_{FB}$ rises. Therefore, similarly to intermittent controller 12 shown in FIG. 5, extension of the term of comparative voltage $V_{FB}$ lower than reference voltage $V_{ES}$ can maintain sufficient time for the intermittent operation. As power control circuit 16 suspends supply of drive power $V_{CC}$ to oscillator 10 in response to control signal $V_{C1}$ from second comparator 24 for transferring MOS-FET 3 to the intermittent operation, power control circuit 16 can prevent generation of pulse signal $V_{OSC}$ from oscillator 10 for the cessation period of MOS-FET 3 during the whole intermittent operation of MOS-FET 3 inclusive of the extended term.

What is claimed are:

1. A DC-DC converter comprising a primary winding of a transformer and at least one switching element connected in series to a DC power source; a secondary winding of the transformer; a rectifying smoother connected to the primary or secondary winding of the transformer for supplying DC power to an electric load; an output voltage detector for sensing an output voltage to the load to produce a detection signal; and a control circuit for receiving the detection signal from the output voltage detector to produce on-off signals to a control terminal of the switching element;

the control circuit comprising an oscillator for generating pulse signals of a given frequency; a drive signal generator for producing on-off signals to the control terminal of the switching element in synchronization with pulse signals from the oscillator; an intermittent controller for producing a control signal to the drive signal generator in response to the level of detection signal from the output voltage detector to switch the switching element to the intermittent operation during the light load period; and a power control circuit for ceasing power supply to the oscillator during the light load period in response to the control signal from the intermittent controller;

wherein said drive signal generator comprises a gate circuit for producing a drive signal to a control terminal of said switching element; and a first comparator for producing a control signal to cease generation of drive signal from said gate circuit when decreasing comparative voltage with rising output voltage is lower than voltage the level corresponding to the amount of winding current through said switching element;

said intermittent controller comprises a second comparator for producing a control signal to said gate circuit of said drive signal generator to stop drive signal from said gate circuit when said comparative voltage is lower than a reference voltage;

said second comparator switches the reference voltage from a first reference voltage to a second reference voltage higher than the first reference voltage to extend the rising term of the comparative voltage lower than the reference voltage; and said power control circuit prevents generation of pulse signal from the oscillator for the cessation period of the switching element during the whole intermittent operation of switching element inclusive of the extended rising term of the comparative voltage.

2. The DC-DC converter of claim 1, wherein said power control circuit comprises a switch connected between a drive power source for supplying drive power and the oscillator, said switch being turned off by control signal from the intermittent controller.

3. The DC-DC converter of claim 1, wherein said oscillator comprises a signal generator for producing pulse signals; and a power supplying circuit for supplying drive power to said signal generator of said oscillator;

said power supplying circuit has switch elements connected between said signal generator and a drive power source for supplying drive power; and said power control circuit turns said switch elements off upon receiving the control signal from said intermittent controller.

4. A DC-DC converter comprising a primary winding of a transformer and at least one switching element connected in series to a DC power source; a secondary winding of the transformer; a rectifying smoother connected to the primary or secondary winding of the transformer for supplying DC power to an electric load; an output voltage detector for sensing an output voltage to the load to produce a detection signal; and a control circuit for receiving the detection signal from the output voltage detector to produce on-off signals to a control terminal of the switching element;

the control circuit comprising an oscillator for generating pulse signals of a given frequency; a drive signal generator for producing on-off signals to the control terminal of the switching element in synchronization with pulse signals from the oscillator; an intermittent controller for producing a control signal to the drive signal generator in response to the level of detection signal from the output voltage detector to switch the switching element to the intermittent operation during the light load period; and a power control circuit for ceasing power supply to the oscillator for the cessation period of the switching element during the intermittent operation of the switching element in response to the control signal from the intermittent controller during the light load period;

wherein said drive signal generator comprises a gate circuit for producing a drive signal to a control terminal of said switching element; and a first comparator for producing a control signal to cease generation of drive signal from said gate circuit when decreasing comparative voltage with rising output voltage is lower than voltage the level corresponding to the amount of winding current through said switching element;

said intermittent controller comprises a second comparator for producing a control signal to said gate circuit of said drive signal generator to stop drive signal from said gate circuit when said comparative voltage is lower than a reference voltage;

said second comparator switches the reference voltage from a first reference voltage to a second reference voltage higher than the first reference voltage to extend the rising term of the comparative voltage lower than the reference voltage; and said power control circuit prevents generation of pulse signal from the oscillator for the cessation period of the switching element during the whole intermittent operation of the switching element inclusive of the extended rising term of the comparative voltage.

* * * * *